United States Patent [19]

Maglic

[11] Patent Number: 4,930,929

[45] Date of Patent: Jun. 5, 1990

[54] GLASS TUBE/STAINLESS STEEL HEADER INTERFACE FOR PRESSURE SENSOR

[75] Inventor: Rastko C. Maglic, Colorado Springs, Colo.

[73] Assignee: Honeywell Inc., Minneapolis, Minn.

[21] Appl. No.: 412,962

[22] Filed: Sep. 26, 1989

[51] Int. Cl.$^5$ .............................................. F16B 1/00
[52] U.S. Cl. .................................. 403/29; 403/270; 403/404; 73/754
[58] Field of Search ............... 403/270, 28, 29, 404; 73/754

[56] References Cited

U.S. PATENT DOCUMENTS

| | | | |
|---|---|---|---|
| 2,506,687 | 5/1950 | Scherrer | 403/270 X |
| 2,650,683 | 9/1953 | McPhee et al. | 403/28 |
| 3,374,530 | 3/1968 | Flanders et al. | 29/484 |
| 3,660,632 | 5/1972 | Leinkram | 219/85 |
| 4,019,388 | 4/1977 | Hall, II et al. | 73/398 |
| 4,213,004 | 7/1980 | Acker et al. | 174/151 |
| 4,487,999 | 12/1984 | Baird et al. | 174/52 |
| 4,499,774 | 2/1985 | Tsuchiya et al. | 73/727 |
| 4,506,108 | 3/1985 | Kersch et al. | 174/52 |
| 4,764,747 | 8/1988 | Kurtz et al. | 338/2 |

*Primary Examiner*—Andrew V. Kundrat
*Attorney, Agent, or Firm*—W. T. Udseth

[57] ABSTRACT

An assembly for relieving shear stress when indirectly mounting a glass tube to a metallic header containing a pressure to be measured. A bore within the header includes first and second shoulders and first and second radially outwardly extending surfaces. An iron-nickel interface having an axially extending position and a radially outwardly extending portion is secured to the header by welding only at the juncture of the inside radius of the axially extending portion with the first shoulder, leaving the interface free to expand nearly stress free along the radially outwardly extending surfaces within the bore.

5 Claims, 1 Drawing Sheet

GLASS TUBE/STAINLESS STEEL HEADER INTERFACE FOR PRESSURE SENSOR

BACKGROUND OF THE INVENTION

The present invention relates generally to indirectly mounting a pressure sensitive silicon chip to a metallic header such as stainless steel and more particularly to the use of a glass tube holder for the silicon chip and a iron-nickel (Kovar) interface between the glass tube and the header.

In electronic pressure transmitters an existing problem is the mounting of the silicon chip to the stainless steel header. The very different thermal expansion coefficients of the silicon chip and the stainless steel would cause the silicon chip to be damaged due to expansion and contraction of the stainless steel if it was directly bonded to the stainless steel. Therefore a holder in the form of a glass tube is often used for mounting the silicon chip. When a glass tube holder is used to mount the silicon chip, the problem becomes how to connect the glass tube to the stainless steel.

Various methods of indirectly mounting a glass tube to a steel header have been used in the past. In particular U.S. Pat. No. 4,019,388 issued to George R. Hall et al. on Apr. 26, 1977 discloses a glass tube holder for a silicon chip and a nickel-iron holder for indirectly mounting the glass tube to a steel housing. The Hall patent recognizes the advantage of using a nickel-iron or Kovar interface which may be joined to both glass and stainless steel and has a coefficient of thermal expansion that is intermediate between the thermal expansion coefficient of the silicon chip and that of the stainless steel.

However, the Hall patent does not disclose the considerations for releasing stress on the glass tube through a particular Kovar interface construction and through a particular configuration for connecting the interface to the stainless steel.

Thus a need exists for a Kovar interface that is both constructed in a way and connected to the stainless steel in a way to reduce stress on the glass tube.

SUMMARY OF THE INVENTION

The present invention solves these and other needs by providing a mounting assembly for connecting a glass tube to a stainless steel header. The stainless steel header includes a bore having a first shoulder and a second shoulder. A Kovar interface washer is secured only at its inside diameter to the first shoulder which allows the interface to freely expand and contract and thereby release shear stress on the glass tube.

DESCRIPTION OF THE PREFERRED EMBODIMENT

Figure 1:
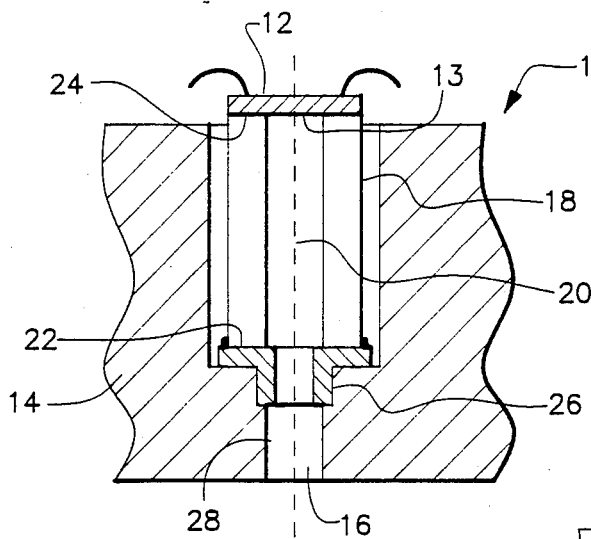
FIG. 1 is a cross section of a pressure sensitive silicon chip mounted to a stainless steel header by way of a glass tube and an interface in accordance with applicant's invention.

Referring now to the drawings, a mounting assembly according to the teachings of the present invention is shown in the figures and generally designated 10.

A pressure sensitive silicon chip 12 is shown indirectly mounted to stainless steel header 14. The pressure to be measured is present in header passageway 16. Glass tube 18 has an inside radius r1, and outside radius r2 and a bore 20. Bore 20 is in communication with passageway 16. Glass tube 18 also includes first end 22 and second end 24. Interface 26 is located between first end 22 of glass tube 18 and header 14. First end 22 is secured to interface 26 by known soldering techniques for securing glass to Kovar. Silicon chip 12 includes a pressure sensitive portion 13. Silicon chip 12 is mounted to the second end 24 of glass tube 18 with pressure sensitive portion 13 exposed to the pressure to be measured.

Figure 2:
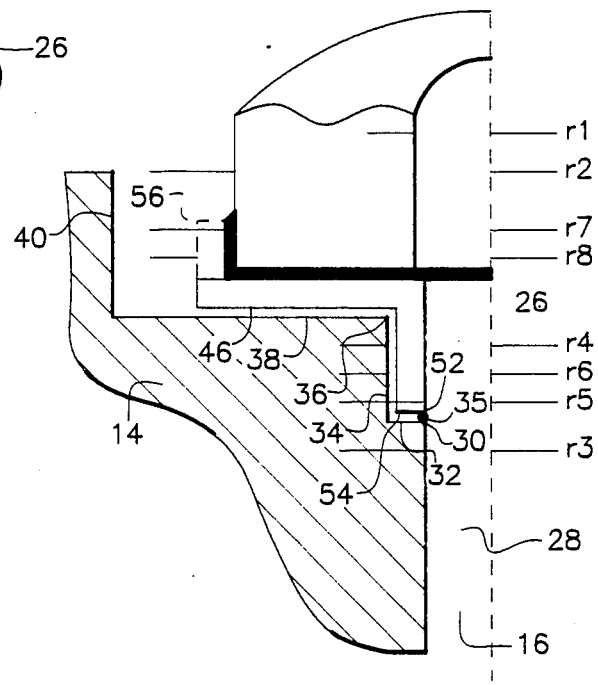
FIG. 2 is an enlarged partial cross section of the glass tube, the interface and the stainless steel header. An alternate embodiment which includes a lip is shown in phantom.

As best shown in FIG. 2. Metallic header 14 has a bore 28 which defines passageway 16. Passageway 16 has a radius r3. A first shoulder 30 is formed in bore 28. Annular surface 32 extends radially outwardly from first shoulder 30 to sidewall 34. Sidewall 34 has a radius r4. A second shoulder 36 is formed concentric with first shoulder 30.

Annular surface 38 extends radially outwardly from second shoulder 36 to second sidewall 40.

Figure 3:
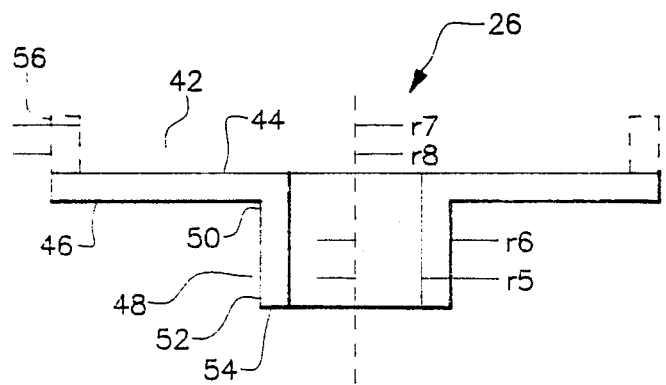
FIG. 3 is a cross section of the interface only with the lip shown in phantom.

Interface 26 as best seen in FIG. 3 includes radially outwardly extending portion 42 and axial portion or tubular section 48. Portion 42 includes top surface 44 and bottom surface 46. Axial portion or tubular section 48 has an inside radius r5 and an outside radius r6. Tubular section 48 includes first, upper end 50, second, lower, end 52 and surface 54 of lower end 52. Upper end 50 of tubular section 48 is integrally secured to radially outwardly extending portion 42. In a first alternate embodiment interface 26 also includes an upstanding lip 56 which has an inside radius r7 and an outside radius r8.

Lower end 52 of axially extending portion 48 is secured only at its inside radius r5 to first shoulder 30 of bore 28. Interface 26 may be secured to shoulder 30 for example, by welding or brazing. This welding or brazing should be done only between inside radius r5 of interface 26 and first shoulder 30.

This allows interface 26 to expand and contract with increasing and decreasing temperature and yet remain relatively stress free. Specifically surface 54 of lower end 52 is free to move along first annular surface 32 and bottom surface 46 of radially outwardly extending portion 42 is free to move along second annular surface 38.

Now that the construction and operation of device 10 have been described, many advantages can be appreciated.

Past solutions to mounting a glass tube to a stainless steel header have focussed on making an interface that has a linear thermal expansion coefficient ($\alpha$) between the coefficient of the glass tube ($\alpha G$) and the coefficient of the stainless steel ($\alpha SS$). That is $$\alpha G < \alpha K < \alpha SS$$

where $\alpha K$ is the linear thermal coefficient of expansion of the interface.

With applicant's invention the brazing is done only on the inside radius the interface and the brazing forms only a single circle essentially along the line of brazing. Therefore, except at the circle where it is brazed, the interface is free to expand and contract independent of the header in function of temperature. This makes the interface essentially stress free. Further, $\alpha K$ need not be intermediate between $\alpha G$ and $\alpha K$. With applicant's invention $\alpha K$ may be made nearly equal to $\alpha G$ almost without regard to $\alpha SS$.

Figure 4:
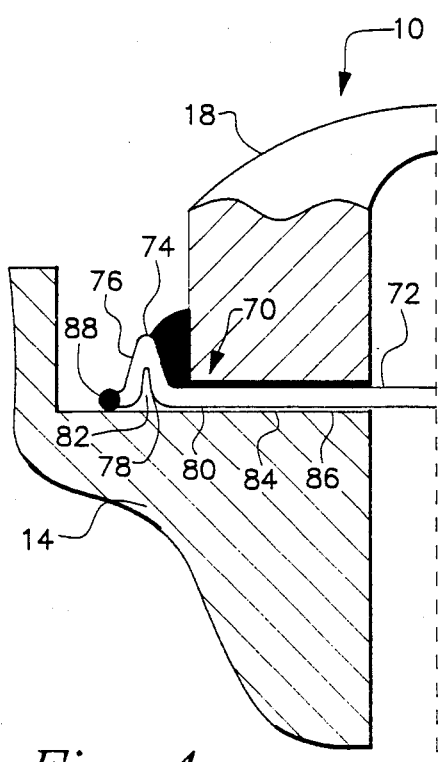
FIG. 4 shows a cross section of a second alternate embodiment of applicant's invention.

A second alternate embodiment of device 10 is shown in FIG. 4. Interface 70 is in the form of a generally planar washer having a hole 72 at its center to allow the pressure to be measured to pass into glass tube 18. Interface 70 includes an upstanding portion adjacent the outer radius of the interface. The upstanding portion is in the form of a crimp with sides 76 and 78 of the crimp intersecting with surface 80 of stainless steel header 14 to form a generally triangular void 82. Interface 70 may be secured to header 14 by a weld 88 at an outer radius of the interface. Thus interface 70 is secured to header 14 only at a single circle. Interface 70 may almost freely expand or contract and bottom surface 84 of interface 70 may move along surface 86 of stainless steel header 14.

The embodiments of the invention in which an exclusive property or right is claimed are defined as follows:

1. A mounting assembly for indirectly mounting a glass tube having an end to a metallic header, said mounting assembly comprising:
   said metallic header having a bore, said bore having a first shoulder and a second shoulder, said second shoulder axially displaced from said first shoulder;
   a first annular surface extending radially outwardly from said first shoulder;
   a second annular surface extending radially outwardly from said second shoulder;
   said bore further having a sidewall, said sidewall having a radius, said sidewall connecting said first annular surface with said second annular surface;
   an interface comprising a radially outwardly extending portion and an axially extending portion, said radially outwardly extending portion having a top surface and a bottom surface, said axially extending portion having a first end, a second end, an inside radius and an outside radius with said outside radius being smaller than said radius of said bore sidewall; with said first end integrally connected to said bottom surface of said radially outwardly extending portion;
   said end of said glass tube attached to said top surface of said radially outwardly extending portion of said interface;
   said interface received in said bore with said bottom surface of said radially outwardly extending portion adjacent said first annular surface, and said outside radius of said axially extending portion spaced from said sidewall of said bore, with said second end of said axially extending portion located adjacent said first annular surface; and
   means for securing said interface to said header only at the junction of said inside radius of said second end of said axially extending portion with said first shoulder to allow substantially stress free expansion of said interface to reduce the likelihood of the breakage of said glass tube.

2. The mounting assembly of claim 1 wherein said means for securing said interface to said header is by welding.

3. The mounting assembly of claim 2 wherein said interface is made of an iron-nickel alloy.

4. An improved mounting assembly for mounting a glass tube to a metallic header having a bore, said mounting assembly of the type having an iron-nickel alloy interface received within said bore and an end of said glass tube attached to said interface, wherein the improvement comprises:
   said bore having a first shoulder and a second shoulder, said second shoulder axially displaced from said first shoulder;
   a first annular surface extending radially outwardly from said first shoulder;
   a second annular surface extending radially outwardly from said second shoulder;
   said bore further having a sidewall, said sidewall having a radius, said sidewall connecting said first annular surface with said second annular surface;
   said interface comprising a radially outwardly extending portion and an axially extending portion, said radially outwardly extending portion having a top surface and a bottom surface, said axially extending portion having a first end, a second end, aan inside radius and an outside radius with said outside radius being smaller than said radius of said bore sidewall; with said first end integrally connected to said bottom surface of said radially outwardly extending portion;
   said end of said glass tube attached to said top surface of said radially outwardly extending portion of said interface;
   said interface received in said bore with said bottom surface of said radially outwardly extending portion adjacent said first annular surface, and said outside radius of said axially extending portion spaced from said sidewall of said bore, with said second end of said axially extending portion located adjacent said first annular surface; and
   means for securing said interface to said header only at the junction of said inside radius of said second end of said axially extending portion with said first shoulder to allow substantially stress free expansion of said interface to reduce the likelihood of the breakage of said glass tube.

5. The mounting assembly of claim 4 wherein said means for securing said interface to said header is by welding.

* * * * *